United States Patent
Hyodo

(10) Patent No.: US 10,473,123 B2
(45) Date of Patent: Nov. 12, 2019

(54) METAL BELLOWS TYPE ACCUMULATOR

(71) Applicant: EAGLE INDUSTRY CO., LTD., Tokyo (JP)

(72) Inventor: Daisuke Hyodo, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 71 days.

(21) Appl. No.: 15/566,173

(22) PCT Filed: May 18, 2016

(86) PCT No.: PCT/JP2016/064680
§ 371 (c)(1),
(2) Date: Oct. 12, 2017

(87) PCT Pub. No.: WO2016/194609
PCT Pub. Date: Dec. 8, 2016

(65) Prior Publication Data
US 2018/0087539 A1   Mar. 29, 2018

(30) Foreign Application Priority Data

May 29, 2015   (JP) ................................. 2015-109881

(51) Int. Cl.
*F15B 1/10* (2006.01)
*F15B 1/14* (2006.01)
(Continued)

(52) U.S. Cl.
CPC ................ *F15B 1/103* (2013.01); *F15B 1/14* (2013.01); *F16J 3/04* (2013.01); *F16J 3/047* (2013.01);
(Continued)

(58) Field of Classification Search
CPC ............ F15B 1/103; F15B 1/14; F16L 55/053
See application file for complete search history.

(56) References Cited

U.S. PATENT DOCUMENTS 4,997,009 A * 3/1991 Niikura .............. B60G 17/0424
138/30
5,205,326 A * 4/1993 Paley .................... F16L 55/033
138/30
(Continued)

FOREIGN PATENT DOCUMENTS

CN        1178171 A      4/1998
CN      101809294 A      8/2010
(Continued)

OTHER PUBLICATIONS

Chinese Office Action for Application No. 2016-800200626 dated Sep. 3, 2018 with English translation (8 pages).
(Continued)

*Primary Examiner* — F Daniel Lopez
*Assistant Examiner* — Matthew Wiblin
(74) *Attorney, Agent, or Firm* — Harness, Dickey & Pierce, P.L.C.

(57) ABSTRACT

The invention provides a metal bellows type accumulator having an outer shell provided in its one end with a pressure introducing passage in an opening manner, an axially expandable metal bellows including peak portions directed to an outer side in a radial direction and trough portions directed to an inner side alternately in an axial direction, having an axially fixed end to the outer shell and separating an inner chamber of the outer shell into a pressure introducing chamber and a gas chamber charged with cushion gas, and a support member arranged in an inner periphery of the metal bellows, fixed to the outer shell and constructed by a cushioning member. A clearance in a radial direction between the trough portions of the metal bellows and the support member is smaller than a clearance in a radial direction between the peak portions of the metal bellows and the outer shell.

5 Claims, 5 Drawing Sheets

(51) Int. Cl.
*F16J 3/04* (2006.01)
*F16F 9/08* (2006.01)

(52) U.S. Cl.
CPC . *F15B 2201/205* (2013.01); *F15B 2201/3153* (2013.01); *F15B 2201/3158* (2013.01); *F16F 9/082* (2013.01)

(56) References Cited

U.S. PATENT DOCUMENTS

| | | | |
|---|---|---|---|
| 6,616,247 B2 * | 9/2003 | Mohr | F15B 1/103 138/30 |
| 2010/0307146 A1 * | 12/2010 | Lehnert | F15B 1/021 60/414 |
| 2011/0226370 A1 | 9/2011 | Arikawa et al. | |
| 2012/0006438 A1 | 1/2012 | Nakaoka et al. | |

FOREIGN PATENT DOCUMENTS

| | | | | |
|---|---|---|---|---|
| CN | 103075236 A | | 5/2013 | |
| DE | 10009865 A1 * | | 9/2001 | ............. F15B 1/021 |
| DE | 10207248 A1 * | | 4/2003 | ............. F15B 1/103 |
| DE | 103 55 321 A1 | | 6/2005 | |
| JP | 2-113139 A | | 4/1990 | |
| JP | 09242703 A * | | 9/1997 | ............. F15B 1/103 |
| JP | 2000-257991 A | | 9/2000 | |
| JP | 2005-098391 A | | 4/2005 | |
| JP | 2005-155923 A | | 6/2005 | |
| JP | 2007-192290 A | | 8/2007 | |
| JP | 4608980 B2 * | | 1/2011 | ............. F15B 1/103 |
| JP | 2013-194871 A | | 9/2013 | |
| JP | 2014-005882 A | | 1/2014 | |
| WO | WO-2005073564 A1 * | | 8/2005 | ............. F15B 1/103 |

OTHER PUBLICATIONS

Extended European Search Report for Application No. EP 16 803 044 dated Jun. 5, 2018 (6 pages).

* cited by examiner

METAL BELLOWS TYPE ACCUMULATOR

CROSS-REFERENCE TO RELATED APPLICATIONS

This application is a U.S. National Stage Application of International Application No. PCT/JP2016/064680, filed on May 18, 2016, and published in Japanese as WO 2016/194609 A1 on Dec. 8, 2016 and claims priority to Japanese Application No. 2015-109881, filed on May 29, 2015. The entire disclosures of the above applications are incorporated herein by reference.

BACKGROUND OF THE INVENTION

Field of the Invention

The present invention relates to an accumulator which is used in a fluid pressure line such as a hydraulic system or a pneumatic system, and more particularly to a metal bellows type accumulator which employs a metal bellows as a separating means of cushion gas and fluid pressure.

Description of the Conventional Art

The accumulator is a device which is used in the fluid pressure line such as the hydraulic system or the pneumatic system, and is generally used for a pressure control which temporarily stores the fluid pressure by utilizing compressibility of N2 gas or absorbs pulsation of pressure generated in the pressure line so as to make the pulsation smooth. There are an accumulator which employs a bladder as the separating means between the cushion gas constructed by the N2 gas and the fluid pressure, and an accumulator which employs a piston or a metal bellows as the separating means. Among them, the metal bellows type accumulator can hold down permeation leakage of the gas to approximately 0, and has a high durability.

As the metal bellows type accumulator, there has been conventionally known a structure, for example, as shown in FIG. 4 or 5. Among them, the metal bellows type accumulator shown in FIG. 4 is of a type which is called as "internal gas structure". This metal bellows type accumulator is provided with an outer shell 101, a metal bellows 102 and a vibration damping ring 103. The outer shell 101 is constructed by a cylindrical shell 101a, and first and second end covers 101b and 101c which are provided in such a manner as to close both ends of the shell 101a. The metal bellows 102 is constructed by a bellows main body 102a which is fixed its one end to the second end cover 101c by welding, can expand and contract in an axial direction and is made of a metal, and a bellows cap 102b which is attached by welding in such a manner as to close an opening in a free end side of the bellows main body 102a. The vibration damping ring 103 is attached to an outer periphery of a free end of the metal bellows 102 (the bellows main body 102a). A pressure introducing passage 104 is provided in an opening manner in the first end cover 101b.

An inner chamber of the outer shell 101 is separated into a pressure introducing chamber 105 between the metal bellows 102 and the shell 101a, and a gas chamber 106 in an inner periphery of the metal bellows 102 by the metal bellows 102. Among them, the pressure introducing chamber 105 is introduced the fluid pressure of the fluid pressure line (not shown) via a pressure introducing passage 104, and the gas chamber 106 in an inner side of the metal bellows 102 is charged the cushion gas such as N2 gas (refer, for example, to Japanese Unexamined Patent Publication No. 2005-098391).

On the other hand, the metal bellows type accumulator shown in FIG. 5 is of a type which is called as "external gas structure". This metal bellows type accumulator is provided with an outer shell 101, a metal bellows 102 and a vibration damping ring 103. The outer shell 101 is constructed by a closed-end cylindrical shell 101a and an end cover 101d which is provided so as to close an opening end of the shell 101a. The metal bellows 102 is arranged within the outer shell 101 and is constructed by a bellows main body 102a which is fixed its one end to the end cover 101d by welding, can expand and contract in an axial direction and is made of metal, and a bellows cap 102b which is attached by welding so as to close an opening in a free end side of the bellows main body 102a. The vibration damping ring 103 is attached to an outer periphery of the free end of the metal bellows 102 (the bellows main body 102a). A pressure introducing passage 104 is provided in an opening manner in the end cover 101d.

An inner chamber of the outer shell 101 is separated by the metal bellows 102 into a pressure introducing chamber 105 which is provided in an inner periphery of the metal bellows 102 and communicates with the pressure introducing passage 104, and a gas chamber 106 which is provided between the metal bellows 102 and the shell 101a. Among them, the pressure introducing chamber 105 is introduced a fluid pressure in a fluid pressure line (not shown) via the pressure introducing passage 104, and the gas chamber 106 is charged with cushion gas such as N2 gas. Reference numeral 107 denotes a stay which restricts displacement of the metal bellows 102 in a compressing direction (refer, for example, to Japanese Unexamined Patent Publication No. 2013-194871).

These metal bellows type accumulators are structured such that the metal bellows 102 displaces in an expansion and contraction manner due to difference in pressure between the fluid pressure introduced into the pressure introducing chamber 105 from the fluid pressure line (not shown) via the pressure introducing passage 104, and the pressure of the cushion gas charged in the gas chamber 106. More specifically, when the fluid pressure in the fluid pressure line introduced into the pressure introducing chamber 105 rises, the metal bellows 102 stores the rising pressure by compressing the gas chamber 105 and displacing so as to expand the pressure introducing chamber 105. When the fluid pressure in the fluid pressure line comes down, the metal bellows 102 discharges the stored pressure to the fluid pressure line by reducing the volumetric capacity of the pressure introducing chamber 105 as well as increasing the volumetric capacity of the gas chamber 106 on the basis of the pressure in the gas chamber 106 which is relatively high. Further, in the operation mentioned above, the vibration damping ring 103 is structured such as to suppress deflection in a radial direction of the free end of the metal bellows 102, an outer peripheral surface of the vibration damping ring 103 does not come into close contact with an inner peripheral surface of the shell 101a, and a clearance allowing fluid communication exists between the both.

However, the deflection in the radial direction according to the expanding and contracting operation of the metal bellows 102 is not necessarily the maximum in the free end of the metal bellows 102. In the case that the length in the axial direction of the metal bellows 102 is long, there tends to be generated a stationary wave in which both ends thereof are set to nodes of vibration and an intermediate portion thereof is set to an antinode of the vibration, and an amplitude becomes the greatest in the intermediate portion in the axial direction of the bellows main body 102*a* in the vibration. As a result, it is desired to prevent the bellows main body 102*a* from being deformed or damaged due to the contact of the bellows main body 102*a* with the inner peripheral surface of the shell 101.

The present invention is made by taking the above points into consideration, and a technical object of the present invention is to provide a metal bellows type accumulator which does not cause reduction of durability due to contact of the metal bellows with the inner peripheral surface of the outer shell on the basis of the vibration of the metal bellows in the radial direction.

SUMMARY OF THE INVENTION

The present invention employs the following means for achieving the technical object mentioned above.

More specifically, a metal bellows type accumulator according to the present invention is provided with an outer shell which is provided in its one end with a pressure introducing passage in an opening manner, a metal bellows which is capable of expanding and contracting in an axial direction, is formed peak portions directed to an outer side in a radial direction and trough portions directed to an inner side alternately in an axial direction, is fixed its one end in the axial direction to the outer shell and separates an inner chamber of the outer shell into a pressure introducing chamber which is communicated with the pressure introducing passage and a gas chamber which is charged with cushion gas, and a support member which is arranged in an inner periphery of the metal bellows, is fixed to the outer shell and has a cushioning property in its outer peripheral surface, and is structured such that a clearance in a radial direction between the trough portions of the metal bellows and the support member is smaller than a clearance in a radial direction between the peak portions of the metal bellows and the outer shell (claim 1).

The metal bellows type accumulator having the structure mentioned above is structured such that the metal bellows expands and contracts in the axial direction on the basis of the difference between the fluid pressure which is introduced into the pressure introducing chamber via the pressure introducing passage, and the pressure of the cushion gas which is charged in the gas chamber. In the case that any vibration in the radial direction is generated in the metal bellows in the course of the expansion and contraction mentioned above, the vibration is restricted by the contact of the trough portions of the metal bellows with the outer peripheral surface of the support member since the clearance in the radial direction between the trough portions of the metal bellows and the support member in the inner periphery thereof is smaller than the clearance in the radial direction between the peak portions of the metal bellows and the outer shell. As a result, it is possible to prevent the peak portion of the metal bellows from coming into collision with the inner peripheral surface of the outer shell. Further, since the outer peripheral surface of the support member has the cushioning property, the impact of the metal bellows caused by the contact of the support member with the outer peripheral surface can be held down.

The present invention may further employ the following means for achieving the above technical object.

More specifically, in the metal bellows type accumulator having the structure mentioned above (claim 1), a length in an axial direction from a fixed end of the metal bellows to a leading end of the support member is equal to or less than a minimum length in an axial direction caused by compression of the expansion and contraction portion of the metal bellows (claim 2).

More specifically, the expanding and contracting operation of the metal bellows is not prevented by the support member by making the length in the axial direction from the fixed end of the metal bellows to the leading end of the support member equal to or less than the minimum length in the axial direction caused by the compression of the expansion and contraction portion of the metal bellows. Further, there is not generated any impact or load due to the contact in the axial direction of the metal bellows with the support member.

Effect of the Invention

On the basis of the metal bellows type accumulator according to the present invention, the deflection can be restricted even if the deflection in the radial direction is generated in the metal bellows, since the trough portions of the metal bellows comes into contact with the support member which is constructed by the cushioning material. As a result, it is possible to prevent the collision with the inner peripheral surface of the outer shell, and an excellent durability of the metal bellows can be secured.

DETAILED DESCRIPTION OF PREFERRED EMBODIMENTS

A description will be given below of preferable embodiments of a metal bellows type accumulator according to the present invention with reference to the accompanying drawings.

Figure 1:
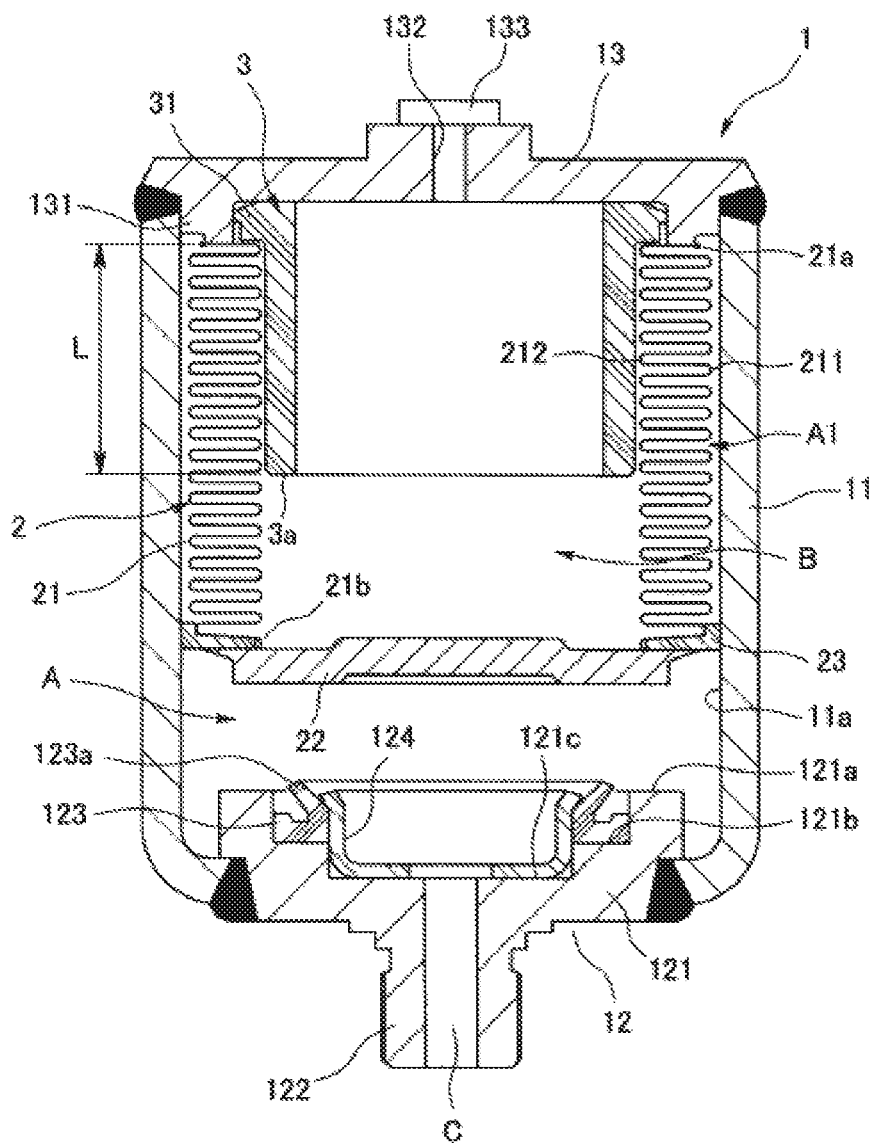
FIG. 1 is a cross sectional view showing a first embodiment of a metal bellows type accumulator according to the present invention.

First of all, in a first embodiment shown in FIG. 1, reference numeral 1 denotes an outer shell, and reference numeral 2 denotes a metal bellows. The first embodiment is obtained by applying the present invention to a metal bellows type accumulator called as "internal gas structure" in which an outside space of the metal bellows 2 is set to a pressure introducing chamber and an inside space of the metal bellows 2 is set to a gas chamber.

The outer shell 1 is provided with a shell 11 which is formed into a cylindrical shape, a first end cover 12 which is provided in one end in an axial direction of the shell 11, and a second end cover 13 which is provided in the other end in the axial direction of the shell 11. The shell 11, the first end cover 12 and the second end cover 13 are all manufactured by metal.

The first end cover 12 in the outer shell 1 has a flange portion 121 which is integrally bonded its outer periphery to one end in the axial direction of the shell 11, and a joint portion 122 which protrudes out of its inner periphery to an outer side, and a pressure introducing passage C is provided in an opening manner in an inner periphery of the joint portion 122.

The second end cover 13 in the outer shell 1 is structured such that an annular convex portion 131 formed in an outer periphery is fitted to the other end in the axial direction of the shell 11 and is bonded thereto by welding. Further, a gas charge port 132 for charging cushion gas such as N2 into the gas chamber B in the inner side of the metal bellows 2 is provided in an opening manner in a center portion of the second end cover 13, and is sealed by a gas plug 133.

The metal bellows 2 is structured such as to separate the inner chamber of the outer shell 1 into the pressure introducing chamber A which is communicated with the pressure introducing passage C, and the gas chamber B which is charged with the cushion gas. The metal bellows 2 is constructed by a bellows main body 21 and a discoid bellows cap 22, and can expand and contract in relation to the axial direction. The bellows main body 21 is bonded to the annular convex portion 131 of the second end cover 13 by welding in one end (a fixed end) 21a in the axial direction, is repeatedly formed peak portions 211 and trough portions 212, and is made of metal. The discoid bellows cap 22 is bonded to and integrated with the other end (a free end) 21b of the bellows main body 21 by welding in its outer peripheral portion. The peak portions 211 are continuous in a circumferential direction toward an outer side in a radial direction, and the trough portions 212 are continuous in the circumferential direction toward an inner side in the radial direction. The bellows main body 21 corresponds to the expansion and contraction portion described in claim 2.

A vibration damping ring 23 is attached to an outer periphery of the free end 21b of the metal bellows 2 (the bellows main body 21). The vibration damping ring 23 is structured such as to restrict displacement of the free end 21b of the bellows main body 21 in the radial direction, and has a clearance in relation to the inner peripheral surface 11a of the shell 11, so as to prevent an outer peripheral space A1 of the bellows main body 21 corresponding to a part of the pressure introducing chamber A from being sealed.

An inner end 121a and circular concave portions 121b and 121c are concentrically formed in the flange portion 121 of the first end cover 12 in the outer shell 1, the inner end 121a facing in an axial direction to an outer peripheral surface of the bellows cap 22 in the metal bellows 2, and the concave portions 121b and 121c being positioned in an inner peripheral side thereof. Among them, a seal member 123 is installed to the large-diameter concave portion 121b, and an annular seal holder 124 is fitted and attached to the small-diameter concave portion 121c, the annular seal holder 124 supporting the seal member 123 from an inner peripheral side and being made of the metal.

The seal member 123 is formed by a rubber elastic body, has a seal lip 123a which a shape which is directed to the bellows cap 22 side of the metal bellows 2 and is open to an outer peripheral side, and is structured such as to obstruct between the pressure introducing chamber A and the pressure introducing passage C on the basis of the close contact of the bellows cap 22 with the seal lip 123a when the bellows cap 22 in the free end of the metal bellows 2 comes into contact with the inner end 121a of the flange portion 121 in the first end cover 12 by the elongation of the metal bellows 2.

A cylindrical support member 3 is arranged in an inner periphery of the metal bellows 2, and a flange portion 31 formed in one end in an axial direction thereof is fitted and fixed to an inner periphery of an annular convex portion 131 of a second end cover 13 in the outer shell 1. The support member 3 has a desired rigidity, and is formed by a synthetic resin member having a cushion property.

Figure 2:
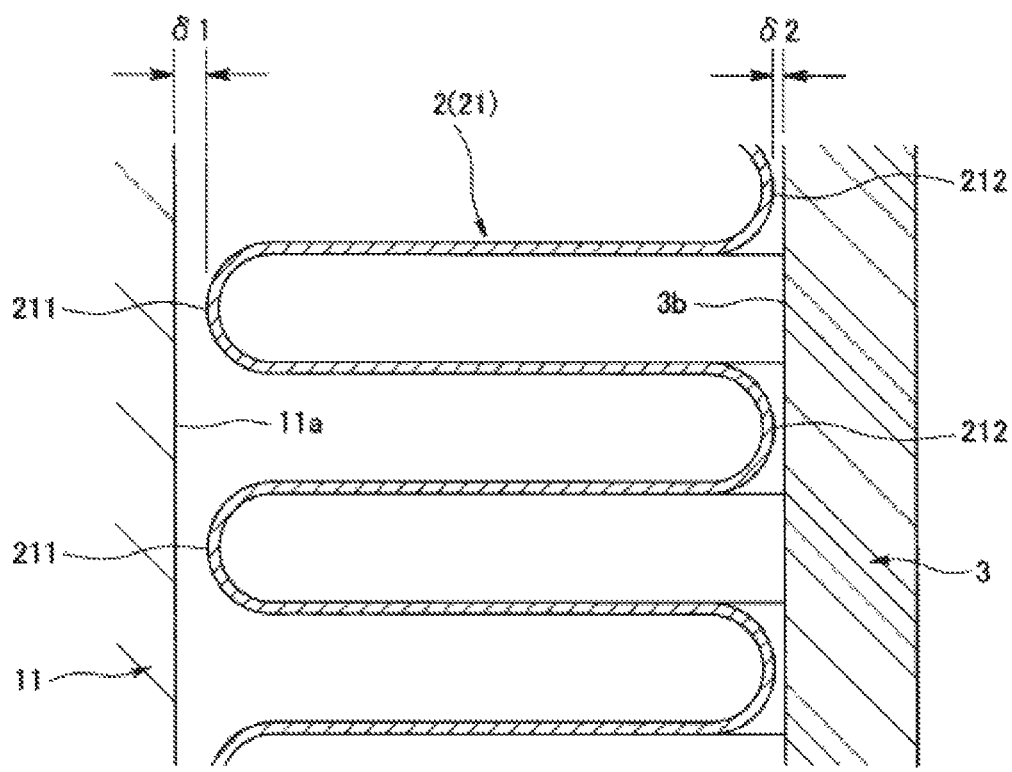
FIG. 2 is a cross sectional view showing a substantial part in FIG. 1 in an enlarged manner.

The support member 3 is positioned its leading end 3a in the vicinity of a middle of the maximum length in the axial direction when the metal bellows 2 (the bellows main body 21) elongates, and a length L from a position of a fixed end 21a of the bellows main body 21 in the axial direction to a leading end 3a of the support member 3 is equal to or less than the minimum length of the bellows main body 21 in the axial direction at the compressing time. Further, as shown in FIG. 2 a clearance 2 in a radial direction between the trough portion 212 of the bellows main body 21 and the outer peripheral surface 3b of the support member 3 is smaller than a clearance 1 in a radial direction between the peak portion 211 of the bellows main body 21 and the inner peripheral surface 11a of the shell 11 in the outer shell 1.

The metal bellows type accumulator having the structure mentioned above is structured such that the joint portion 122 (the pressure introducing passage C) of the first end cover 12 is connected to a hydraulic line (not shown). Further, in the case that the pressure of operating oil flowing within a piping of the hydraulic line becomes higher than the charge pressure of the cushion gas within the gas chamber B, the operating oil flows into the pressure introducing chamber A through the pressure introducing passage C of the first end cover 12, and the metal bellows 2 is compressed. Further, in the case that the hydraulic pressure within the hydraulic line is lowered from this state, the metal bellows 2 is elongated by the pressure in the gas chamber B, and the operating oil within the pressure introducing chamber A is discharged out to the hydraulic line.

Here, in the case that the metal bellows 2 is elongated together with the reduction of the hydraulic pressure within the pressure introducing chamber A, the elongation is restricted by the contact of the bellows cap 22 in the free end of the metal bellows 2 with the inner end 121a of the flange portion 121 in the first end cover 12. Further, at this time, the pressure introducing chamber A and the pressure introducing passage C are obstructed therebetween since the bellows cap 22 of the metal bellows 2 comes into close contact with the leading end of the seal lip 123a in the seal member 123. Therefore, the pressure in the pressure introducing chamber A is not lowered but can be kept in a state in which the pressure in the pressure introducing chamber A is approximately equalized the pressure in the gas chamber B even if the hydraulic pressure of the hydraulic line is further lowered thereafter. As a result, any excessive load caused by differential pressure between the pressure introducing chamber A and the gas chamber B does not act on the bellows main body 21 of the metal bellows 2.

Further, the deflection to the radial direction is generated in the metal bellows 2 in conjunction with the expanding and contracting operation as mentioned above. In the case that the vibration is the stationary wave in which the fixed end 21a of the bellows main body 21 is set to the node and the free end 21b is set to the antinode, the vibrating displacement in the radial direction of the free end 21b is restricted by the vibration damping ring 23. As a result, it is possible to effectively prevent the free end 21b of the bellows main body 21 and the vicinity thereof from being damaged by the contact with the inner peripheral surface 11a of the shell 11 in the outer shell 1.

Further, in the case that the vibration to the radial direction in conjunction with the expansion and contraction of the metal bellows 2 is the stationary wave in which the fixed end 21a and the free end 21b of the bellows main body 21 are set to the node, and the intermediate portion in the axial direction is set to the antinode, the trough portion 212 positioned in the intermediate portion in the axial direction of the bellows main body 21 comes into contact with the outer peripheral surface 3b of the support member 3 in the inner periphery thereof in the course of the deflection since 1>2 is established. As a result, since the vibration in the radial direction can be restricted, it is possible to prevent the peak portion 211 of the bellows main body 21 from coming into collision with the inner peripheral surface 11a of the shell 11. Further, since the support member 3 is made of the synthetic resin material having the cushioning property, the impact of the bellows main body 21 caused by the contact of the support member 3 with the outer peripheral surface 3b can be held down, and any wear and damage is not generated in the trough portion 212 of the bellows main body 21.

Further, since the length L in the axial direction from the position in the axial direction of the fixed end 21a of the bellows main body 21 to the leading end 3a of the support member 3 is equal to or less than the minimum length in the axial direction of the bellows main body 21 at the compressing time in the support member 3, the expanding and contracting operation of the metal bellows 2 is not obstructed by the support member 3. As a result, any great differential pressure is not generated between the pressure introducing chamber A and the gas chamber B when the metal bellows 2 is compressed.

Figure 3:
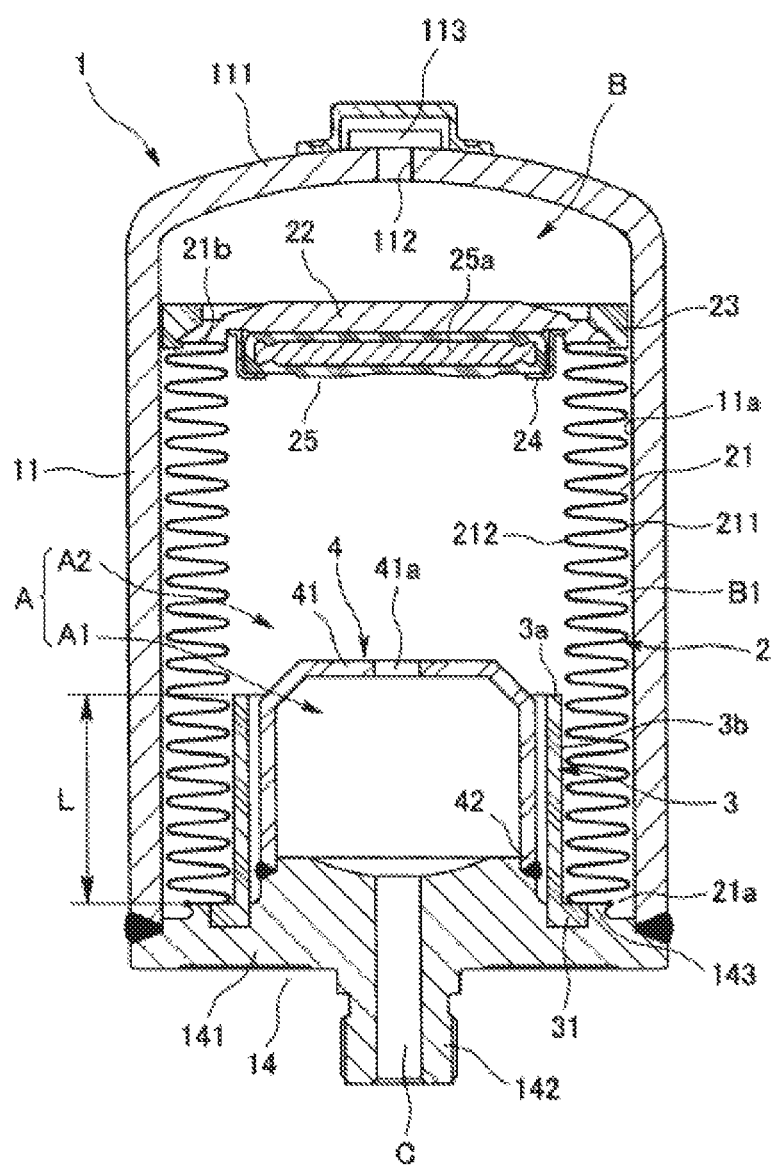
FIG. 3 is a cross sectional view showing a second embodiment of the metal bellows type accumulator according to the present invention.
Figure 4:
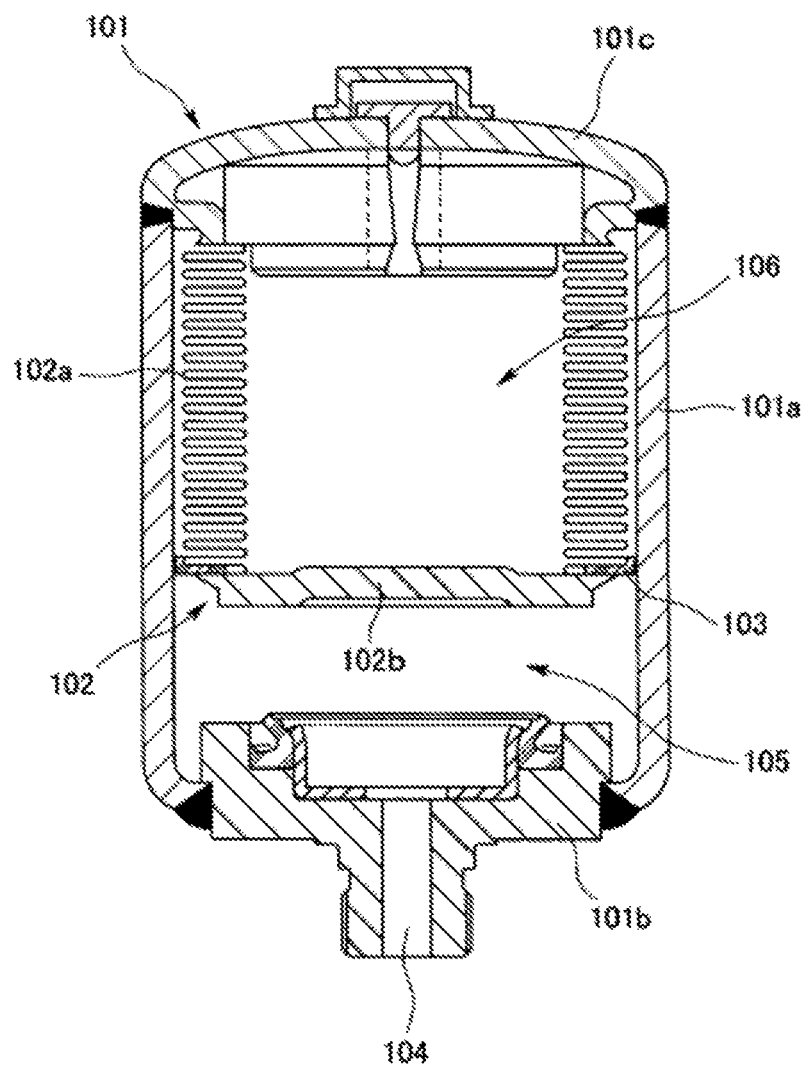
FIG. 4 is a cross sectional view showing an example of the conventional metal bellows type accumulator.
Figure 5:
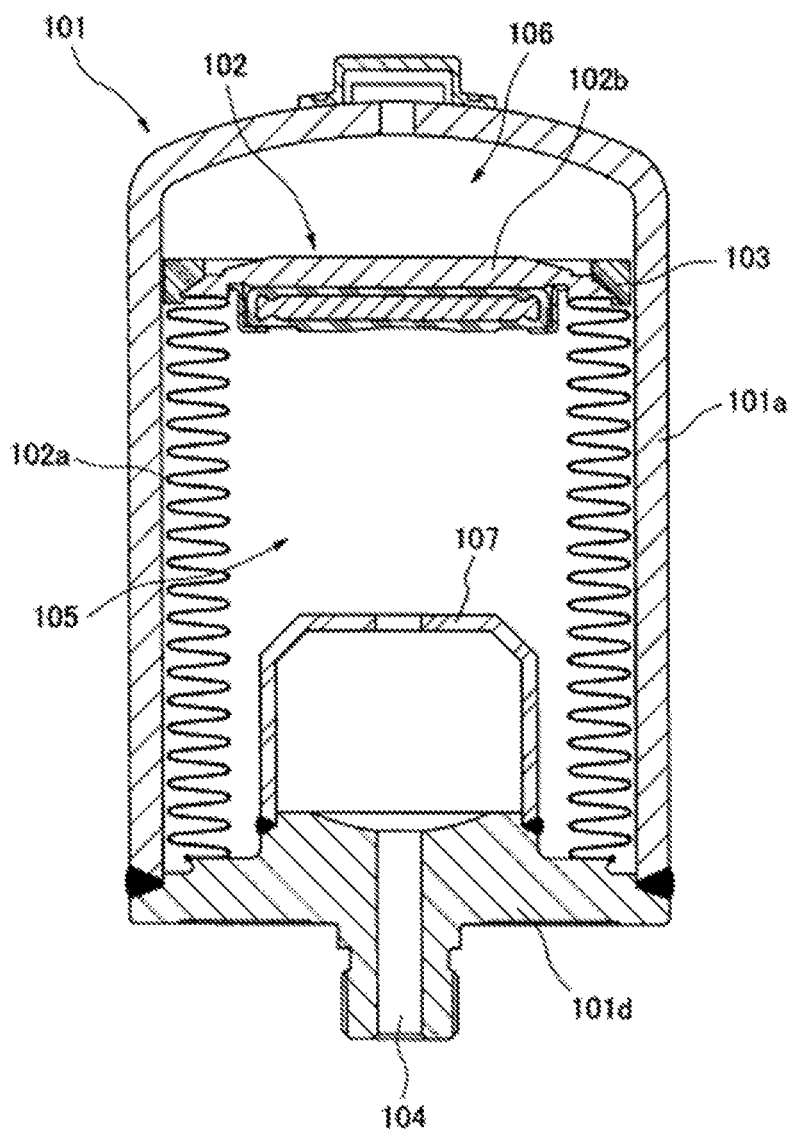
FIG. 5 is a cross sectional view showing the other example of the conventional metal bellows type accumulator.

Next, FIG. 3 shows a second embodiment to which the present invention is applied, with regard to a metal bellows type accumulator called as "external gas structure" in which an inside space of the metal bellows 2 is set to the pressure introducing chamber A and an outside space of the metal bellows 2 is set to the gas chamber B.

More specifically, in the metal bellows type accumulator shown in FIG. 3, the outer shell 1 is constructed by a shell 11 which is formed into a closed-end cylindrical shape, and an end cover 14 which is provided in such a manner as to close an opening end of the shell 11. The end cover 14 has a flange portion 141 which is bonded its outer periphery to the opening end of the shell 11 by welding, and a joint portion 142 which protrudes out of an inner periphery thereof to an outer side, and a pressure introducing passage C communicating with the pressure introducing chamber A in the inner side of the metal bellows 2 is provided in an opening manner in an inner periphery of the joint portion 142. Further, a gas charge port 112 for charging the cushion gas such as N2 gas into the gas chamber B is provided in an opening manner in a center portion of a bottom portion 111 in an opposite side to the end cover 14 in the shell 11, and is sealed by a gas plug 113.

The metal bellows 2 is structured such that one end (a fixed end) 21a in an axial direction is bonded to an annular convex portion 143 formed in the end cover 14 by welding, is constructed by a bellows main body 21 in which peak portions 211 and trough portions 212 are repeatedly formed and is made of metal, and a discoid bellows cap 22 which is bonded to and integrated with the other end (a free end) 21b in the axial direction of the bellows main body 21 in its outer peripheral portion by welding and serves as an end plate, and can expand and contract in relation to the axial direction. The peak portions 211 are continuous in a circumferential direction toward an outer side in a radial direction and the trough portions 212 are continuous in the circumferential direction toward an inner side in the radial direction.

A vibration damping ring 23 is attached to an outer periphery of the bellows cap 22 of the metal bellows 2. The vibration damping ring 23 is structured such as to restrict the displacement in the diametrical direction for preventing the free end 21b of the bellows main body 21 from coming into contact with the inner peripheral surface 11a of the shell 11 in the outer shell 1, and is formed into a shape having a clearance between the vibration damping ring 23 and the inner peripheral surface 11a of the shell 11 so as to prevent an outer peripheral space B1 of the bellows main body 21 which is a part of the gas chamber B from being sealed.

A closed-end cylindrical stay 4 is arranged in the pressure introducing chamber A in the inner side of the metal bellows 2, the stay 4 restricting the displacement of the metal bellows 2 in the compressing direction, and an end portion 42 in an opposite side to a bottom portion 41 thereof is bonded to the end cover 14 by welding. Further, a communication hole 41a is provided in an opening manner in a center portion of the bottom portion 41 facing to the bellows cap 22 side in the stay 4, the communication hole 41a communicating an inside space A1 and an outside space A2 of the stay 4 in the pressure introducing chamber A.

A seal member 25 is retained to the pressure introducing chamber A (the space A2) side in the bellows cap 22 of the metal bellows 2 via an annular holder 24. The seal member 25 is formed so as to cover a disc 25a made of the metal with a rubber elastic body, and is structured such as to close the communication hole 41a by being pressed against the bottom portion 41 of the stay 4 by means of the bellows cap 22 when the metal bellows 2 displaces to a stroke end position in the compressing direction.

More specifically, in an illustrated state in which the seal member 25 is away from the bottom portion 41 of the stay 4 and opens the communications hole 41a on the basis of the elongation of the metal bellows 2, the inside space A1 and the outside space A2 of the stay 4 connected to the pressure introducing passage C of the end cover 14 construct the pressure introducing chamber A where the spaces A1 and A2 are communicated with each other through the communication hole 41a. In a state in which the seal member 25 is brought into close contact with the bottom portion 41 of the stay 4 and closes the communication hole 41a on the basis of the compression of the metal bellows 2, the spaces A1 and A2 are obstructed therebetween, and the hydraulic pressure in the space A1 communicating with the pressure introducing passage C does not reach the space A2.

A cylindrical support member 3 is arranged in an inner periphery of the metal bellows 2 (the bellows main body 21) so as to surround an outer periphery of the stay 4, and a flange portion 31 formed in one end in an axial direction thereof is fitted and fixed to an inner periphery of an annular convex portion 143 of the end cover 14 in the outer shell 1. The support member 3 has a desired rigidity and is formed by a synthetic resin having an oil resistance and a cushioning property, for example, polyamide 66 specifically.

A leading end 3a of the support member 3 is positioned at the vicinity of the intermediate of the maximum length in the axial direction when the metal bellows 2 (the bellows main body 21) elongates, and a length L in the axial direction from the position in the axial direction of the fixed end 21a of the bellows main body 21 to the leading end 3a of the support member 3 is shorter than the minimum length in the axial direction of the bellows main body 21 at the compressing time, in other words, is a length which does not reach the position in the axial direction of the bottom portion 41 of the stay 4. Further, the clearance 2 in the diametrical direction between the trough portion 212 of the bellows main body 21 and the support member 3 is smaller than the clearance 1 in the radial direction between the peak portion 211 of the bellows main body 21 and the shell 11 of the outer shell 1, in the same manner as FIG. 2 which is previously described.

The metal bellows type accumulator according to the second embodiment having the structure mentioned above is used by connecting a joint portion 142 of the end cover 14 to a hydraulic line (not shown). Further, in the case that the pressure of the operating oil flowing within the piping of the hydraulic line becomes higher than the charge pressure of the cushion gas within the gas chamber B, the operating oil flows into the inside space A1 of the stay 4 from the pressure introducing passage C in an inner periphery of the end cover 14, and further into the outside space A2 of the stay 4 through the communication hole 41a of the stay 4 from the space A1. Therefore, the metal bellows 2 is elongated so as to reduce the volumetric capacity of the gas chamber B. Further, in the case that the hydraulic pressure within the piping of the hydraulic line is lowered from this state, the metal bellows 2 is compressed while discharging the operating oil in the pressure introducing chamber A to the hydraulic line since the volumetric capacity thereof is enlarged by the pressure of the gas chamber B.

The bellows cap 22 of the metal bellows 2 is restricted its movement in the compressing direction of the metal bellows 2 by the bottom portion 41 of the stay 4 via the seal member 25 at a time point that the hydraulic pressure within the pressure introducing chamber A is lowered to a predetermined value, whereby the compression of the metal bellows 2 is restricted. Further, at this time, the communication hole 41a is closed on the basis of the close contact of the seal member 25 with the bottom portion 41 of the stay 4, and the spaces A1 and A2 are obstructed therebetween in the pressure introducing chamber A. As a result, even if the hydraulic pressure in the hydraulic line is thereafter lowered further, the pressure in the space A2 between the stay 4 and the metal bellows 2 is not lowered, but is kept in a state of being pressure equalized with the gas chamber (the outer peripheral space B1 of the bellows main body 21). Therefore, any excessive load does not act on the bellows main body 21 of the metal bellows 2 on the basis of the differential pressure from the gas chamber B.

Further, the deflection in the radial direction is generated in the metal bellows 2 in conjunction with the expanding and contracting operation as mentioned above. In the case that the vibration is a stationary wave in which the fixed end 21a of the bellows main body 21 is set to the node and the free end 21b is set to the antinode, the vibrating displacement in the radial direction of the free end 21b is restricted by the vibration damping ring 23. As a result, it is possible to effectively prevent the free end 21b of the bellows main body 21 and the vicinity thereof from being damaged by coming into contact with the inner peripheral surface 11a of the shell 11 in the outer shell 1.

Further, in the case that the vibration in the radial direction in conjunction with the expansion and contraction of the metal bellows 2 is a stationary wave in which the fixed end 21a and the free end 21b of the bellows main body 21 are set to the node, and the intermediate portion in the axial direction is set to the antinode, the trough portion 212 positioned in the intermediate portion in the axial direction of the bellows main body 21 comes into contact with the outer peripheral surface 3b of the support member 3 in the inner periphery thereof in the course of the deflection on the basis of the relationship 1>2, whereby the vibrating displacement in the radial direction is restricted. As a result, it is possible to prevent the peak portion 211 of the bellows main body 21 from coming into collision with the inner peripheral surface 11a of the shell 11. Further, since the support member 3 is made of the synthetic resin material having the cushioning property, the impact of the bellows main body 21 caused by the contact with the outer peripheral surface 3b of the support member 3 can be held down, and any wear and damage is not generated in the trough portion 212 of the bellows main body 21. Further, since the support member 3 has the oil resistance, the support member 3 does not generate any deterioration by being regularly dipped into the operating oil within the pressure introducing chamber A.

Further, since the support member 3 is structured such that the length L in the axial direction from the position in the axial direction of the fixed end 21a of the bellows main body 21 to the leading end 3a of the support member 3 is the length which does not reach the position in the axial direction of the bottom portion 41 of the stay 4, that is, is equal to or less than the minimum length in the axial direction of the bellows main body 21 at the compressing time, the expanding and contracting operation of the metal bellows 2 is not prevented by the support member 3.

In the metal bellows type accumulators according to the first and second embodiments mentioned above, the support member 3 is made of the synthetic resin material having the cushioning property in its entirety, however, the cushioning property may be applied to the support member 3 by coating only the outer peripheral surface 3b which can come into contact with the trough portion 212 of the bellows main body 21 with the synthetic resin.

Further, in the metal bellows type accumulator according to the second embodiment, the support member 3 may be attached to the outer periphery of the stay 4.

What is claimed is:
1. A metal bellows type accumulator comprising:
an outer shell which is provided in its one end with a pressure introducing passage;
a metal bellows which is capable of expanding and contracting in an axial direction, the metal bellows having a plurality of alternately arranged peak portions that extend radially outward and trough portions that extend radially inward, the metal bellows being fixed in its one end in the axial direction to the outer shell and separating an inner chamber of the outer shell into a pressure introducing chamber which is communicated with the pressure introducing passage and a gas chamber which is charged with a cushion gas; and
a support member which is arranged in an inner periphery of the metal bellows, the support member being fixed to the outer shell and constructed by a cushioning member;
wherein a clearance in a radial direction between the trough portions of the metal bellows and the support member is less than a clearance in the radial direction between the peak portions of the metal bellows and the outer shell,
a length in the axial direction from the one end of the metal bellows that is fixed to the outer shell to a leading end of the support member is equal to or less than a minimum length of the metal bellows in the axial direction when fully compressed, and
the support member includes a radially outwardly extending flange that is fixed to the outer shell, and a stay is mounted within the support member.

2. A metal bellows type accumulator, comprising:

an outer shell;

a metal bellows that is configured to expand and contract, the metal bellows including a first end that is fixed to the outer shell and a second end that is movable as the metal bellows expands and contracts; and a support member fixed to the outer shell and positioned within the metal bellows, wherein the metal bellows includes a plurality of alternating peaks and troughs, each of the peaks extending radially outward toward the outer shell and each of the troughs extending radially inward toward the support member, each of the peaks are separated from the outer shell by a first distance, and each of the troughs are separated from the support member by a second distance, the second distance being less than the first distance, and the support member includes a radially outwardly extending flange that is fixed to the outer shell, and a stay is mounted within the support member.

3. The metal bellows type accumulator according to claim 2, wherein the support member is constructed as a cushioning member.

4. A metal bellows type accumulator, comprising:

an outer shell;

a metal bellows that is configured to expand and contract, the metal bellows including a first end that is fixed to the outer shell and a second end that is movable as the metal bellows expands and contracts; and a support member fixed to the outer shell and positioned within the metal bellows, wherein the metal bellows includes a plurality of alternating peaks and troughs, each of the peaks extending radially outward toward the outer shell and each of the troughs extending radially inward toward the support member, each of the peaks collectively define an outer cylindrical boundary of the metal bellows, and each of the troughs collectively define an inner cylindrical boundary of the metal bellows, a radial clearance between the inner cylindrical boundary and the support member is less than a radial clearance between the outer cylindrical boundary and the outer shell, and the support member includes a radially outwardly extending flange that is fixed to the outer shell, and a stay is mounted within the support member.

5. The metal bellows type accumulator according to claim 4, wherein the support member is constructed as a cushioning member.

* * * * *